(12) United States Patent
Ulrich et al.

(10) Patent No.: US 11,455,143 B2
(45) Date of Patent: Sep. 27, 2022

(54) USING A LOW-BIT-WIDTH DOT PRODUCT ENGINE TO SUM HIGH-BIT-WIDTH NUMBERS

(71) Applicant: Meta Platforms, Inc., Menlo Park, CA (US)

(72) Inventors: Thomas Mark Ulrich, Mountain View, CA (US); Krishnakumar Narayanan Nair, Newark, CA (US); Ehsan Khish Ardestani Zadeh, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 202 days.

(21) Appl. No.: 16/869,281

(22) Filed: May 7, 2020

(65) Prior Publication Data
US 2021/0349690 A1 Nov. 11, 2021

(51) Int. Cl.
*G06F 7/544* (2006.01)
*G06F 7/483* (2006.01)

(52) U.S. Cl.
CPC ............ *G06F 7/5443* (2013.01); *G06F 7/483* (2013.01)

(58) Field of Classification Search
CPC ................................ G06F 7/5443; G06F 7/483
See application file for complete search history.

(56) References Cited

U.S. PATENT DOCUMENTS

| | | | | |
|---|---|---|---|---|
| 5,793,661 | A * | 8/1998 | Dulong | G06F 7/5443 708/603 |
| 6,247,036 | B1 * | 6/2001 | Landers | G06F 9/30003 708/603 |
| 2006/0106903 | A1 * | 5/2006 | Karaki | G06F 7/505 708/200 |
| 2018/0225093 | A1 * | 8/2018 | Pillai | G06F 7/5235 |

* cited by examiner

*Primary Examiner* — Michael D. Yaary
(74) *Attorney, Agent, or Firm* — Van Pelt, Yi & James LLP

(57) ABSTRACT

A device (e.g., an integrated circuit chip) includes a dot product processing component, a data alignment component, and an accumulator. The dot product processing component is configured to calculate a dot product of a first group of elements stored in a first storage unit with a second group of elements, wherein: each element of the first group of elements is represented using a first number of bits, each value of a group of values stored in the first storage unit is represented using a second number of bits greater than the first number of bits, and each value of the group of values is stored as split segments across more than one element of the elements of the first group of elements. The data alignment component is configured to receive results of the dot product processing component and modify one or more of the results of the dot product processing component. The accumulator is configured to sum outputs of the data alignment component to at least in part determine a sum of the group of values.

20 Claims, 7 Drawing Sheets

USING A LOW-BIT-WIDTH DOT PRODUCT ENGINE TO SUM HIGH-BIT-WIDTH NUMBERS

BACKGROUND OF THE INVENTION

A whole class of complex artificial intelligence problems can be solved using neural networks. Common operations required by many neural networks include summations, multiplications, and dot products, for example, when performing matrix operations. Since artificial intelligence problems are often computationally and data intensive, hardware solutions are often beneficial for improving performance. It is a technical challenge to create a hardware platform that is flexible and computationally efficient. Therefore, there exists a need for techniques directed toward efficient, high throughput hardware schemes that do not introduce significant hardware complexity and expense.

BRIEF DESCRIPTION OF THE DRAWINGS

Various embodiments of the invention are disclosed in the following detailed description and the accompanying drawings.

DETAILED DESCRIPTION

Figure 1:
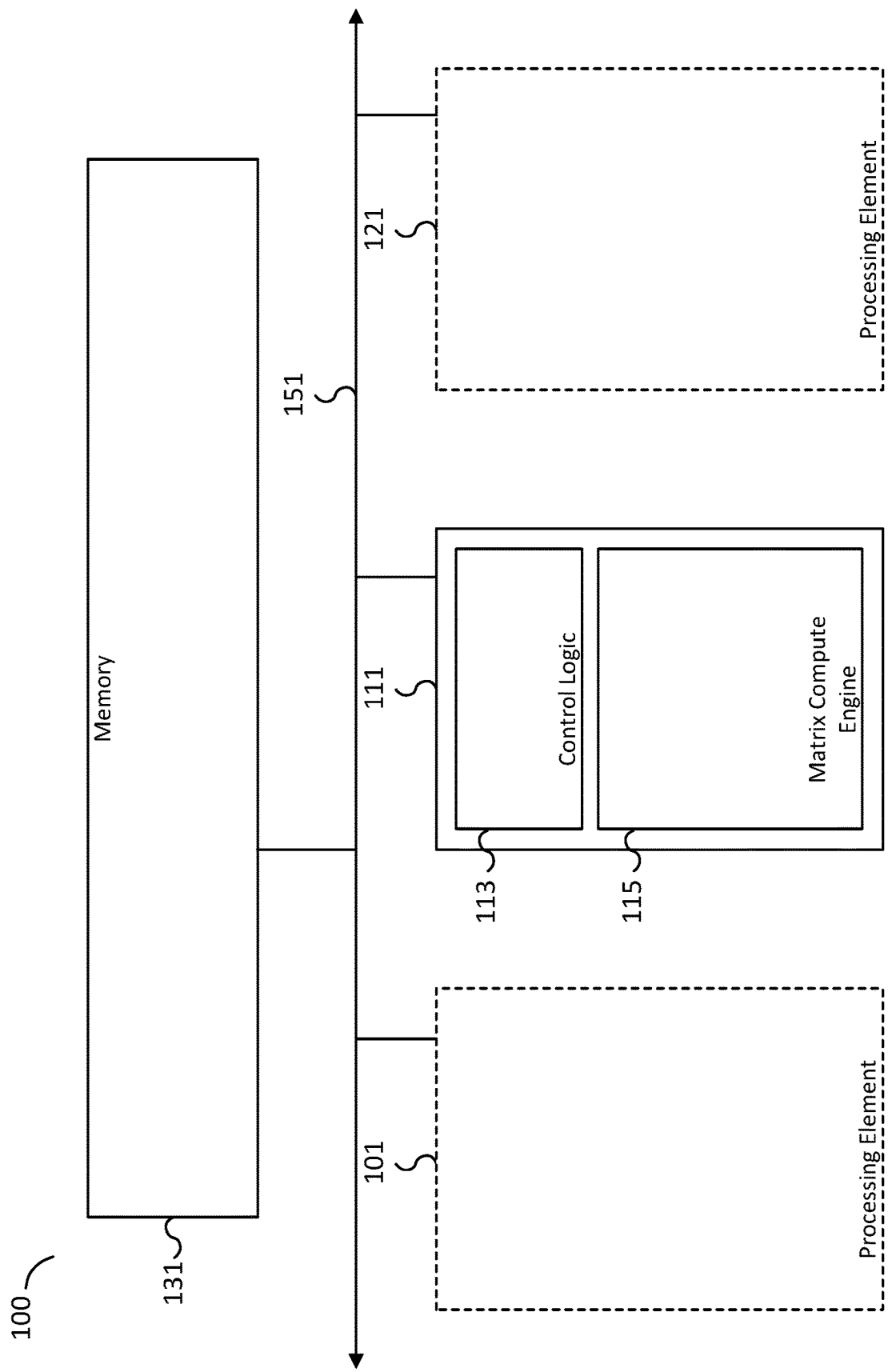
FIG. 1 is a block diagram illustrating an embodiment of a system for solving artificial intelligence problems and other computational problems.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A device for improving the efficiency of numerical processing in hardware is disclosed. The disclosed device includes: a dot product processing component configured to calculate a dot product of a first group of elements stored in a first storage unit with a second group of elements, wherein: each element of the first group of elements is represented using a first number of bits, each value of a group of values stored in the first storage unit is represented using a second number of bits greater than the first number of bits, and each value of the group of values is stored as split segments across more than one element of the elements of the first group of elements; a data alignment component configured to: receive results of the dot product processing component and modify one or more of the results of the dot product processing component; and an accumulator configured to sum outputs of the data alignment component to at least in part determine a sum of the group of values. Practical and technological benefits of the disclosed device include increased flexibility with respect to numerical processing, e.g., the ability to sum higher-bit-width numbers using a lower-bit-width dot product engine.

In some embodiments, a dot product engine (also referred to herein as a dot product processing component) that is able to natively multiply and sum vectors of 8-bit integers and/or 16-bit floating point numbers is used to calculate sums of vectors of 32-bit integers and/or 32-bit floating-point numbers, respectively, by incorporating additional specified hardware. The summing of a vector refers to the summing of the values of all the elements in the vector into a single output value. The summing of the vector is also referred to herein as reducing/reduction of the vector. With respect to vectors of numbers whose bit widths are natively supported by the dot product engine, the dot product engine can reduce a first vector of integer elements or floating-point elements by calculating a dot product of the first vector with a second vector whose elements all have the value 1 in integer or floating-point format, respectively. Using techniques disclosed herein, the dot product engine can also reduce vectors of numbers whose bit widths are higher than those natively supported by the dot product engine. The techniques disclosed herein are applicable to sparse neural networks, convolutions, and other applications.

In some embodiments, a dot product processing component that is able to natively reduce vectors of 8-bit integers (e.g., int8) is used to reduce vectors of 32-bit integers (e.g., int32). In some embodiments, the dot product processing component reads data from memory in 32-byte (256-bit) chunks. It is possible to read an input vector of eight 32-bit integers and perform processing on those 256 bits as if they were thirty-two 8-bit integers. In various embodiments, a vector of 32-bit integers is loaded and each 32-bit integer is stored as four 8-bit chunks $x_{i3}$, $x_{i2}$, $x_{i1}$, and $x_{i0}$, with $x_{i3}$ being the most significant 8 bits and $x_{i0}$ being the least significant 8 bits of a 32-bit integer $x_i$. A first dot product of the input vector of the above groups of 8-bit chunks with a vector of values 0, 0, 0, 1, 0, 0, 0, 1, . . . (also in 8-bit format) can then be calculated using the dot product processing component. This results in a sum of the least significant 8 bits from each 32-bit integer. Stated alternatively, the result is a computation of $x_{00}+x_{10}+ \ldots +x_{70}$ for each group of eight 32-bit integers (when 32-bit integers are loaded in groups of eight). In various embodiments, this intermediate result is stored in an accumulator (e.g., a register). Next, a second dot product of the input vector with a vector 0, 0, 1, 0, 0, 0, 1, 0, . . . can be calculated using the dot product processing component. This results in a sum of the second least significant 8 bits from each 32-bit integer ($x_{01}+x_{11}+ \ldots +x_{71}$). This sum is then left-shifted 8 bits and sent to the accumulator (to add to a running sum). In the next cycle, a third dot product of the input vector with a vector 0, 1, 0, 0, 0, 1, 0, 0, . . . can be calculated using the dot product processing component. This results in a sum of the second most significant 8 bits from each 32-bit integer ($x_{02}+x_{12}+ \ldots +x_{72}$). This sum is then left-shifted 16 bits and sent to the accumulator. In the next cycle, a fourth dot product of the input vector with a vector 1, 0, 0, 0, 1, 0, 0, 0, can be calculated using the dot product processing component. This results in a sum of the most significant 8 bits from each 32-bit integer ($x_{03}+x_{13}+ \ldots +x_{73}$). This sum is then left-shifted 24 bits and sent to the accumulator. At this point, the accumulator stores a final result that is the sum of eight 32-bit integers.

As described in further detail herein, in some embodiments, hardware to perform reduction of vectors of 32-bit integers includes a dot product processing component configured to natively handle vectors of 8-bit integers, a multiplexer configured to route four dot product results, a bit shifter configured to select from among leftward bit shifts of 0, 8, 16, and 24 bits, and an accumulator.

In some embodiments, a dot product processing component that is able to natively reduce vectors of 16-bit floating-point numbers (e.g., Brain Floating Point floating-point format (also referred to herein as bfloat16, BFloat16, etc.)) is used to reduce vectors of 32-bit floating-point numbers (e.g., single-precision floating-point format (also referred to herein as fp32)). In some embodiments, the dot product processing component reads data from memory in 32-byte (256-bit) chunks. It is possible to read an input vector of eight 32-bit fp32 numbers and perform processing on those 256 bits as if they were sixteen bfloat16 numbers. In various embodiments, an input vector of eight fp32 numbers is loaded and stored and treated as sixteen bfloat16 numbers. A first dot product of the input vector with a vector 1, 0, 1, 0, . . . (alternating ones and zeros in bfloat16 format) can be calculated using the dot product processing component and sent to an accumulator. This results in a sum of bfloat16 versions of each of the fp32 numbers because the first sixteen bits of an fp32 number is 1 sign bit, 8 exponent bits, and 7 mantissa bits, which is the bfloat16 format (see FIG. 6 for diagrams of bfloat16 and fp32 data formats). The other sixteen bits of an fp32 number are the other 16 mantissa bits (total of 23 mantissa bits in an fp32 number). Stated alternatively, every other 16-bit chunk of the input vector is a correctly formatted bfloat16 number and the first dot product adds all these bfloat16 chunks together to obtain the correct exponent and the first 7 bits of the final mantissa. In the first dot product, the fp32 mantissa bits beyond the first seven do not affect the result because they are multiplied by 0. Next, the next 8 bits of mantissa from each fp32 number (from the second 16-bit half of each fp32 number) are routed to an input to the dot product processing component (e.g., using a multiplexer to substitute these 8 bits), replacing the first 7 bits of mantissa, and a second dot product with the alternating ones and zeros vector 1, 0, 1, 0, . . . is calculated using the dot product processing component and sent to the accumulator. Eight bits can replace the first 7 bits of mantissa to be processed by the dot product processing component because the extra bit (the $8^{th}$ bit) replaces the J-bit of a normal floating-point number. A value of 8 is subtracted from the second dot product exponent to account for the 8-bit offset of the second dot product's mantissa bits. Next, the last 8 bits of mantissa from each fp32 number (from the second 16-bit half of each fp32 number) are routed to the input to the dot product processing component (e.g., using a multiplexer to substitute these 8 bits) and a third dot product with the alternating ones and zeros vector 1, 0, 1, 0, . . . is calculated using the dot product processing component and sent to the accumulator. As with the second dot product, the $8^{th}$ mantissa bit replaces the J-bit. A value of 16 is subtracted from the third dot product exponent to account for the 16-bit offset of the third dot product's mantissa bits. The final result after accumulation is the sum of the input vector's fp32 numbers.

As described in further detail herein, in some embodiments, hardware to perform reduction of vectors of 32-bit fp32 numbers includes a dot product processing component configured to natively handle vectors of bfloat16 numbers, a plurality of multiplexers configured to select from among three groups of mantissa bits from each fp32 number, a multiplexer configured to route three dot product results, a subtractor configured to select from among the values 0, 8, and 16 to subtract, and an accumulator. In some embodiments, the subtractor is an adder configured to add negative numbers.

The examples described above are merely illustrative. It is also possible to apply the techniques described herein to reduce vectors of numbers of different bit widths and/or in different formats. For example, as would be readily apparent to one skilled in the art, applying the techniques described herein to reduce vectors of 64-bit integers can include performing processing on eight chunks of 8 bits instead of four chunks of 8 bits. Different dot product processing components can also be accommodated. For example, reducing vectors of 64-bit integers using a dot product processing component configured to natively reduce vectors of 16-bit integers can include performing processing on four chunks of 16 bits.

FIG. 1 is a block diagram illustrating an embodiment of a system for solving artificial intelligence problems and other computational problems. For example, system 100 may be applied to use a neural network to solve problems such as image recognition and recommendation system matches. In the example shown, system 100 includes multiple processing elements such as processing elements 101, 111, and 121 connected to memory unit 131 via bus 151. System 100 may include fewer or more processing elements. For example, the number of processing elements can be scaled up or down depending on the intended computational and data requirements. In some embodiments, the processing elements, such as 101, 111, and 121, are communicatively connected to one another and/or memory unit 131 via bus 151. For example, the memory unit may be a last level cache (LLC) and/or may be implemented using static random-access memory (SRAM). Each processing element may be utilized by system 100 to perform matrix compute operations such as summations, multiplications, dot products, matrix multiplications, etc., including integer and floating-point operations. In some embodiments, different processing elements are used for different operations and/or data formats. For example, some processing elements may be used to calculate integer dot products and other processing elements used to calculate floating-point dot products.

In some embodiments, a communication bus, such as bus 151, is used to transmit processing element instructions and optional instruction arguments. For example, a matrix operation and matrix operands may be transmitted to a processing element, such as processing elements 101, 111, and/or 121, via bus 151. Additional processing element instructions may include summation, multiplication, dot product, matrix multiplication, etc. operation instructions, such as integer or floating-point operation instructions. In various embodiments, a large, complex artificial intelligence problem can be solved using system 100 by subdividing the problem into smaller sub-problems. The smaller sub-problems can be assigned and distributed to different processing elements. The results of the smaller sub-problems can be merged to determine the solution to the larger and more complex problem. In some scenarios, the sub-problems are solved in parallel and/or in pipelined stages. In some scenarios, the result from a first processing element is fed as an input to a second processing element.

In some embodiments, each processing element of system 100 includes at least a control logic unit and a matrix compute engine. As shown with respect to processing element 111, processing element 111 includes control logic 113 and matrix compute engine 115. Processing elements 101 and 121 are shown as dotted boxes and some details of processing elements 101 and 121 are not shown. In some embodiments, the control logic unit of a processing element is used to control the operation of the processing element, including the operation of the processing element's matrix compute engine. In the example shown, control logic 113 processes instructions directed to processing element 111 via communication bus 151. For example, a processing element instruction may include an integer or floating-point operation instruction. In some embodiments, control logic 113 determines how to perform the integer or floating-point operation using matrix compute engine 115, including how to determine components of integer or floating-point number operands. In some embodiments, control logic 113 receives processing element instructions via bus 151 and can be used to initiate retrieving and/or writing data from/to memory 131.

In some embodiments, matrix compute engine 115 is a hardware matrix compute engine for performing matrix operations including operations related to integer or floating-point summation, multiplication, dot product, matrix multiplication, and/or convolution operations. For example, matrix compute engine 115 may be a matrix engine for performing dot product operations requiring integer or floating-point multiplications and addition operations. In some embodiments, the convolution operations supported include depth-wise, groupwise, normal, regular, pointwise, two-dimensional, and/or three-dimensional convolutions, among others. For example, matrix compute engine 115 may receive a first input matrix such as a subset of a large image and a second input matrix such as a filter, kernel, or convolution matrix, etc. to apply to the first input matrix. Matrix compute engine 115 can be used to perform a convolution operation using the two input matrices to determine a resulting output matrix. In some embodiments, matrix compute engine 115 includes input and/or output buffers for loading input data matrices or vectors and writing out a result data matrix or vector. In some embodiments, matrix compute engine 115 includes multiple vector units and each vector unit includes a vector multiply unit and a vector adder unit.

Figure 2:
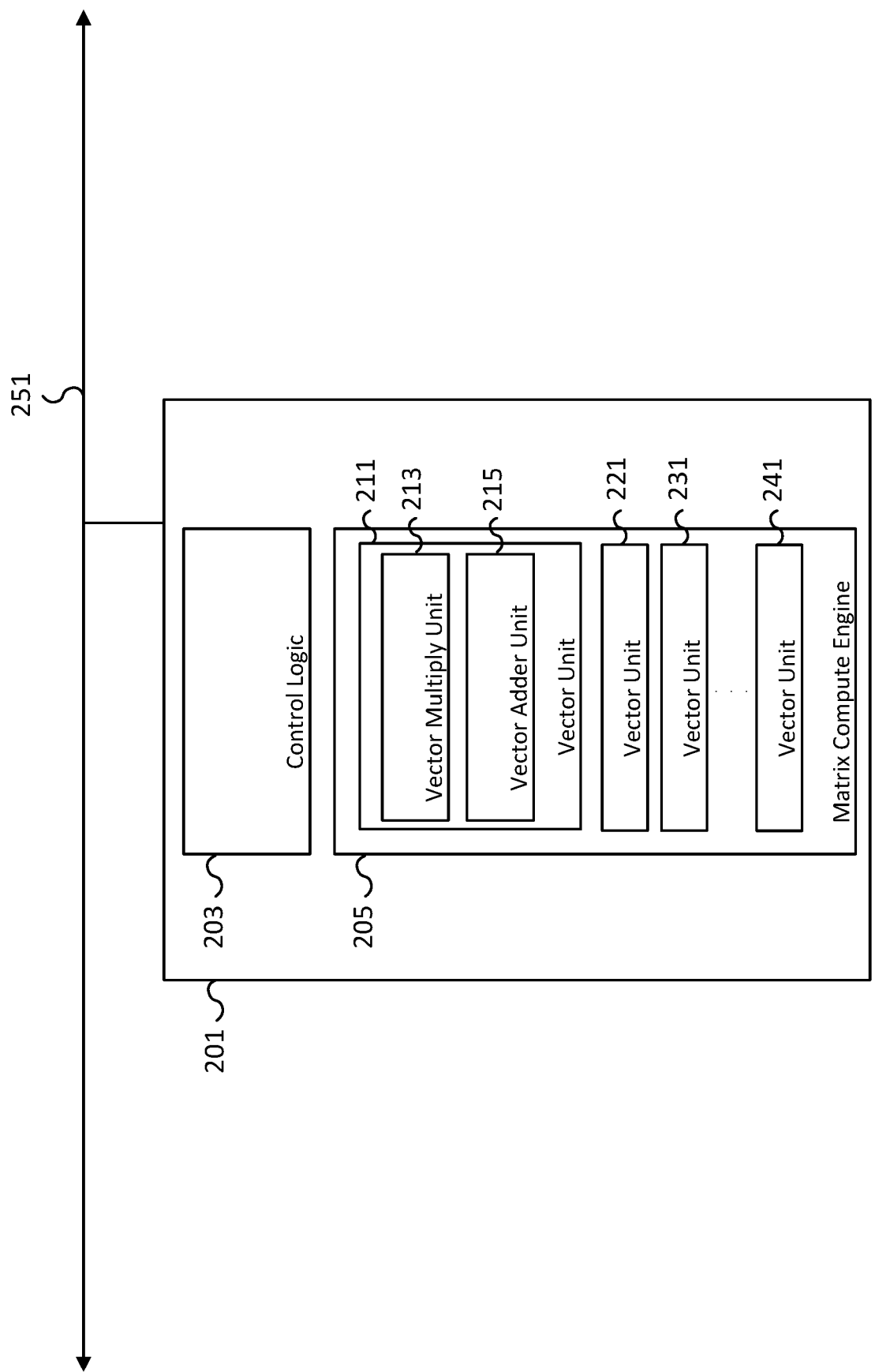
FIG. 2 is a block diagram illustrating an embodiment of a processing element for solving artificial intelligence problems and other computational problems.

FIG. 2 is a block diagram illustrating an embodiment of a processing element for solving artificial intelligence problems and other computational problems. In the example shown, processing element 201 is communicatively connected to bus 251. Processing element 201 includes control logic 203 and matrix compute engine 205. Matrix compute engine 205 includes vector units 211, 221, 231, and 241. Matrix compute engine 205 may include more or fewer vector units. For example, a matrix compute engine may include 32 vector units, each capable of processing two 256-bit vectors. In various embodiments, each vector unit includes a vector multiply unit and a vector adder unit. In the example shown, vector unit 211 includes vector multiply unit 213 and vector adder unit 215. For simplicity, the vector multiply and vector adder units of vector units 221, 231, and 241 are not shown but function similarly to vector multiply unit 213 and vector adder unit 215. In some embodiments, different vector units are used for different operations and/or data formats. For example, some vector units may be used to calculate integer dot products and other vector units used to calculate floating-point dot products. It is also possible for all vector units in a processing element to be used for the same operation and/or data format. In some embodiments, processing element 201 is processing element 101, 111, and/or 121 of FIG. 1. In some embodiments, control logic 203 and matrix compute engine 205 are, respectively, control logic 113 and matrix compute engine 115 of FIG. 1.

In some embodiments, matrix compute engine 205 receives input matrix (or vector) operands to perform matrix operations. For example, matrix compute engine 205 may receive one or more data input vectors corresponding to a portion of an image and at least one weight input vector corresponding to a filter matrix. The input vectors, such as input data and weight vectors, may be passed as arguments to a vector unit, such as one of vector units 211, 221, 231, and 241, of matrix compute engine 205. For example, a vector unit of matrix compute engine 205 may determine a matrix result, such as a dot product result, using a data input vector and weight input vector pair. In some embodiments, matrix compute engine 205 includes 32 vector units. Each vector unit may take two n-element vectors (e.g., 16, 32, etc.) as arguments and each determine an n-element vector result. In some embodiments, the result is a single element result and taken across all vector units of matrix compute engine 205. In some embodiments, the result is an output vector result. In some embodiments, output results are determined by accumulating partial vector results across multiple vector unit operations. For example, a multiplication operation can be decomposed into multiple multiplication operations and the results summed. The number of vector units of matrix compute engine 205 can vary as can the vector unit lengths and element sizes. Depending on the capabilities of the vector unit, different element sizes can be natively supported. In some embodiments, 8-bit integers and 16-bit floating-point formats are natively supported.

In some embodiments, each vector unit of matrix compute engine 205, such as vector units 211, 221, 231, or 241, receives two vector operands and can perform one or more vector operations. For example, a vector unit can compute the result of multiple multiply operations by multiplying each element of the first input vector with a corresponding element of a second input vector. The resulting multiplication results can be accumulated and used for future operations, such as summing partial results. For example, a vector unit result can be accumulated and used as an operand to a subsequent operation performed by the vector unit.

In some embodiments, each vector unit of matrix compute engine 205, such as vector units 211, 221, 231, or 241, includes a vector multiply unit and a vector adder unit. Each vector multiply unit, such as vector multiply unit 213, is configured to multiply corresponding elements received via input vector operands. In some embodiments, the result is a vector of multiplication results. The first element from a first input vector is multiplied with the first element of a second input vector. Similarly, the second element from the first input vector is multiplied with the second element of the second input vector. In various embodiments, the vector of multiplication results is passed to a vector adder unit of the vector unit. For example, vector multiply unit 213 can pass its multiplication results to vector adder unit 215. Vector adder unit 215 can be used for addition operations such as summing partial results, computing at least in part a dot product result, or other appropriate functionality. For example, a dot product can be calculated by using vector adder unit 215 to sum all the elements of the output of vector multiply unit 213.

In some embodiments, each vector adder unit of a vector unit, such as vector adder unit 215, is configured to compute addition operations using elements from an input vector. For example, the sum of selected elements from a vector of multiplication results computed by vector multiply unit 213 can be computed by vector adder unit 215. In some embodiments, the result of a vector adder unit is a dot product of the vectors used as inputs to the corresponding vector multiply unit. In various embodiments, each vector adder unit, such as vector adder unit 215, is implemented as an adder tree. For example, the top level of an adder tree may add pairs of elements to determine a set of partial sums, such as adding elements 0 and 1 to determine a first partial sum and elements 2 and 3 to determine a second partial sum, etc. Each subsequent level may sum pairs of partial sums from the previous level until the last level computes a final result sum. In some embodiments, specified partial sums may be outputted as a result of the adder unit. In some embodiments, each adder tree computes partial sums in parallel to arrive at a result sum. The parallel operation significantly improves the efficiency of summing a vector of numbers. Multiple vector units can operate in parallel to compute multiple results in parallel, significantly improving the throughput of matrix compute engine 205.

In some embodiments, matrix compute engine 205 includes one or more accumulators (e.g., implemented as registers), for example, to accumulate the results of each vector unit. In some embodiments, an accumulator is included as part of a vector unit or as part of matrix compute engine 205 as appropriate. Accumulators may also be separate from but communicatively connected to matrix compute engine 205. The accumulator(s) can be used to sum the results computed across multiple iterations of the vector units. For example, the result from one iteration of a vector unit can be stored in an accumulator and added to the result of the next iteration of the vector unit. In some embodiments, the accumulator is a vector accumulator. For example, the accumulator may be sized based on the size of an output vector of matrix compute engine 205. The accumulator may also be used to store and add a single element result across multiple iterations. In various embodiments, once matrix processing is complete, the accumulator results are pushed to memory via bus 251.

Figure 3:
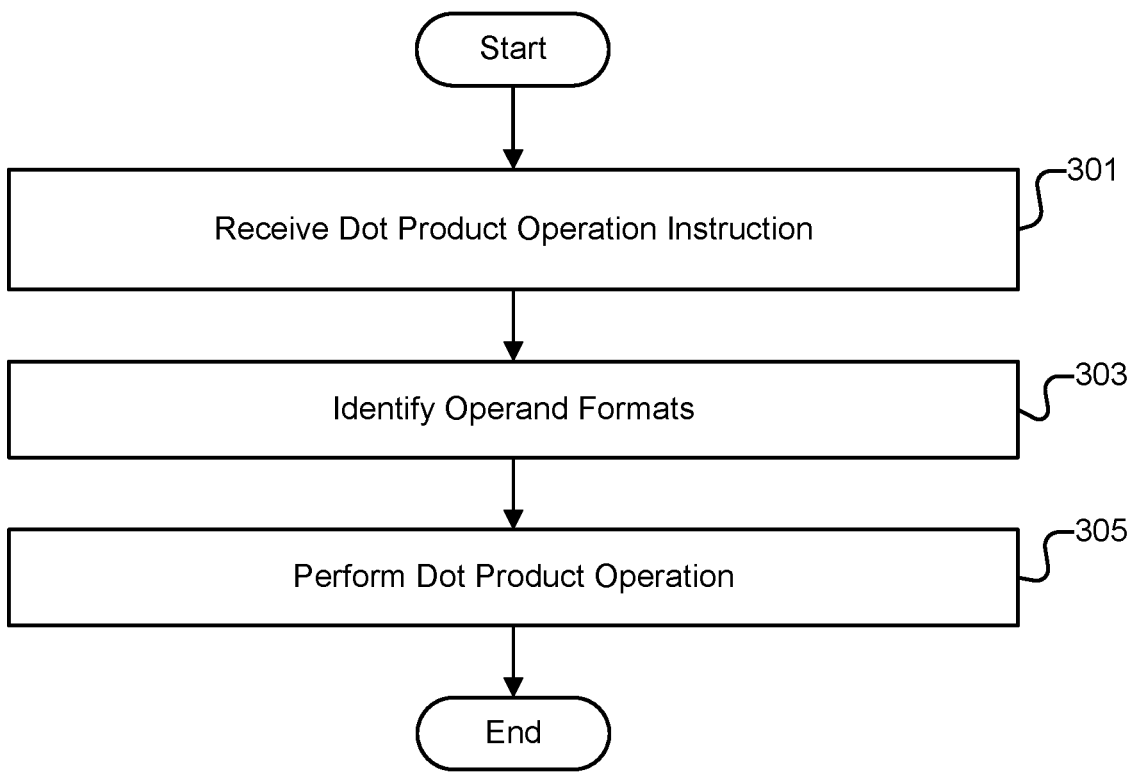
FIG. 3 is a flow chart illustrating an embodiment of a process for performing a dot product operation in hardware.

FIG. 3 is a flow chart illustrating an embodiment of a process for performing a dot product operation in hardware. In the process of FIG. 3, an integer or floating-point dot product operation using operands of various formats may be performed. In some embodiments, the process of FIG. 3 is performed in response to receiving a dot product operation instruction at a control logic unit of a processing element, such as processing elements 101, 111, and/or 121 of FIG. 1 and/or processing element 201 of FIG. 2. In some embodiments, the dot product operation is performed by matrix compute engine 115 of FIG. 1 or matrix compute engine 205 of FIG. 2. For example, vector unit 211 of matrix compute engine 205 of FIG. 2 may be instructed to perform the dot product operation. In some embodiments, the dot product operation is used to perform a summation of all the elements in a first input vector A by calculating a dot product of the first input vector A with a second input vector B whose elements all have the value 1 (in integer or floating-point format depending on the format of the elements of the first input vector A).

At 301, a dot product operation instruction is received. The dot product operation instruction may specify two integer or floating-point vectors. For example, two vectors of operands may be received and each element of a first vector is to be multiplied with a corresponding element of a second vector. If one of the vectors has all ones as elements, the result of the dot product operation will be the summation of the elements of the other vector. Stated alternatively, the result would be the reduction of the other vector.

At 303, the operand formats are identified. In various embodiments, multiple different integer and floating-point formats are supported by the processing element. For example, 8-bit integer (e.g., int8) and 16-bit floating-point (e.g., bfloat16) formats may be supported. In some embodiments, the format is specified by the dot product operation instruction. For example, a flag in the dot product operation instruction can identify a type of integer format or a type of floating-point format.

At 305, the dot product operation is performed. For example, a dot product of two integer vectors or two floating-point vectors can be calculated. A vector unit (e.g., vector unit 211 of FIG. 2) may be used to perform the dot product operation. In some embodiments, the result of the dot product operation is sent to an accumulator. Accumulated results can be utilized to solve the next layer of a neural network and/or combined with results from other processing elements. In some embodiments, the result(s) are written back to memory such as memory 131 of FIG. 1 where the result(s) can be utilized by a subsequent operation.

Figure 4:
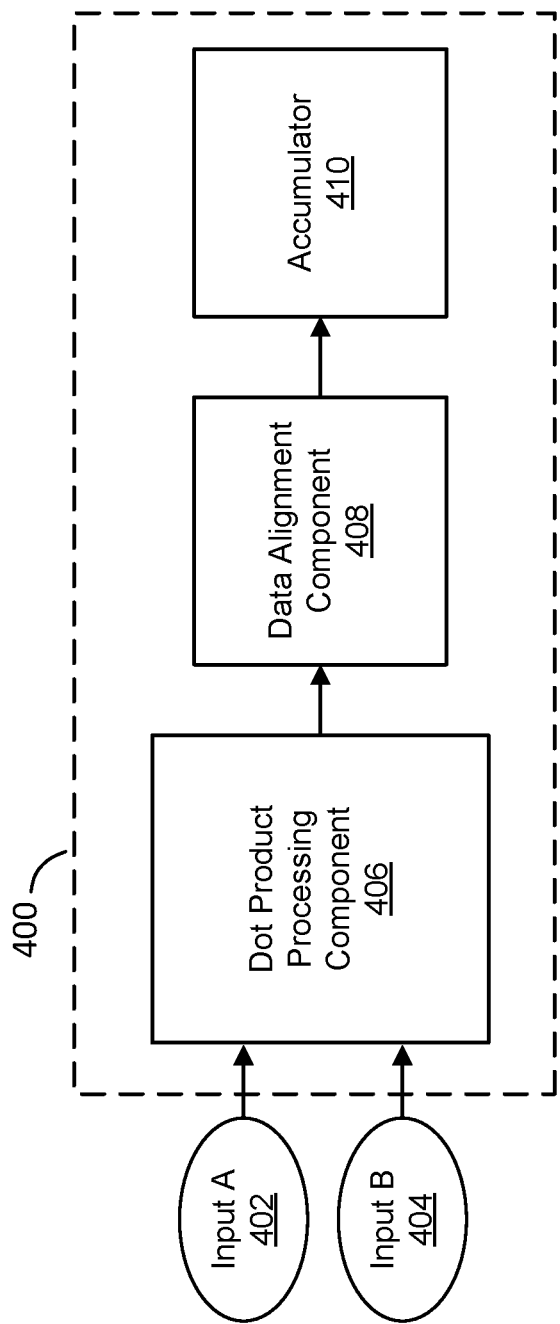
FIG. 4 is a block diagram illustrating an embodiment of a system for processing groups of numbers using a lower-bit-width dot product engine.

FIG. 4 is a block diagram illustrating an embodiment of a system for processing groups of numbers using a lower-bit-width dot product engine. In various embodiments, system 400 is an application-specific integrated circuit (ASIC) device or part of an ASIC device. In some embodiments, system 400 reduces a vector of 32-bit integers (e.g., int32) using a dot product processing component that can natively handle vectors of 8-bit integers (e.g., int8). System 400 may also be configured to reduce a vector of 32-bit floating-point numbers (e.g., fp32) using a dot product processing component that can natively handle vectors of 16-bit floating-point numbers (e.g., bfloat16).

In the example shown, system 400 includes dot product processing component 406, data alignment component 408, and accumulator 410. In some embodiments, dot product processing component 406 is vector unit 211 of FIG. 2. Dot product processing component 406 is configured to perform integer dot products when system 400 reduces integer vectors and floating-point dot products when system 400 reduces floating-point vectors. In the example shown, dot product processing component 406 receives input A 402 and input B 404. In various embodiments, input A 402 and input B 404 are vectors of integers or floating-point numbers. In some embodiments, input A 402 and input B 404 are stored in registers. System 400 can be used to reduce a first input vector (e.g., input A 402). In various embodiments, multiple iterations of processing by dot product processing component 406 occur in order to reduce a vector of values represented using a number of bits greater than what dot product processing component 406 natively uses to represent values.

In the example shown, data alignment component 408 receives a result of dot product processing component 406. In various embodiments, data alignment component 408 aligns the result based on which iteration of processing is occurring. Implementation of data alignment component 408 varies depending on the input format. For example, as described in further detail below, when reducing integer vectors, in various embodiments, data alignment component 408 includes a multiplexer configured to route dot product results and a bit shifter configured to receive a routed dot product result and perform a leftward bit shift that depends on which iteration of processing is occurring. As described in further detail below, when reducing floating-point vectors, in various embodiments, data alignment component 408 includes a multiplexer configured to route dot product results and a subtractor configured to receive a routed dot product result and perform a subtraction that depends on which iteration of processing is occurring. In the example shown, a dot product result that has been modified by data alignment component 408 is transmitted to accumulator 410. In some embodiments, accumulator 410 is implemented as one or more registers. In various embodiments, accumulator 410 accumulates results from multiple iterations of processing by dot product processing component 406 and data alignment component 408. The result from one iteration is stored in accumulator 410 and added to the result of the next iteration.

Figure 5:
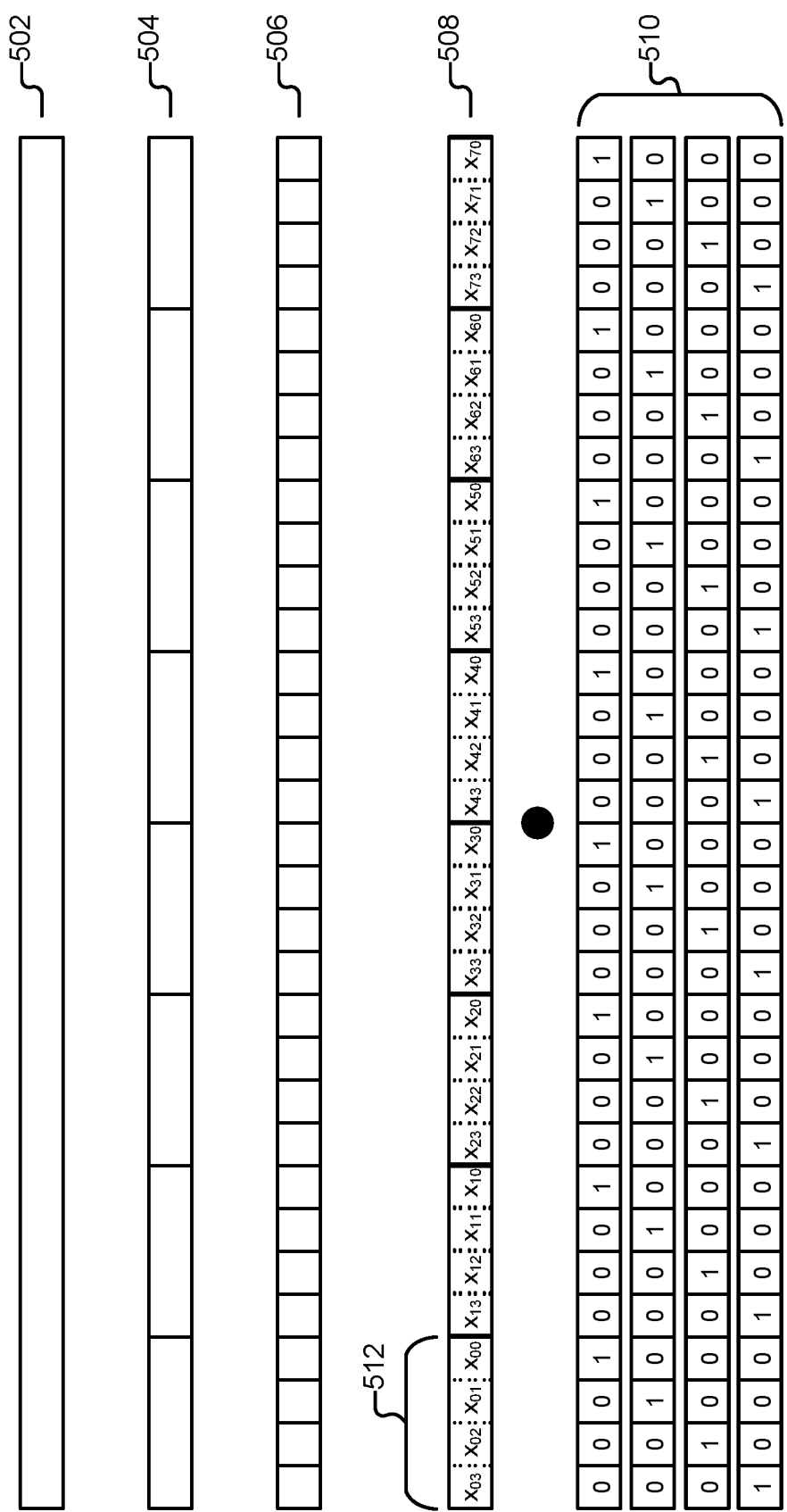
FIG. 5 is a diagram illustrating example data formats associated with processing integer numbers.

When reducing a vector of integers, for each iteration, one of the inputs is the vector of integers to be reduced and the other input is a vector with one and zero values as described below (the two vectors corresponding to input A 402 and input B 404 or vice versa). FIG. 5 illustrates example integer data formats associated with reducing a vector of 32-bit integers when dot product processing component 406 is configured to handle 8-bit integers. In some embodiments, input A 402 and input B 404 are 256-bit data chunks (e.g., data chunk 502 of FIG. 5). Thus, within a 256-bit data chunk, eight 32-bit integers can be loaded and summed as illustrated by layout 504 of FIG. 5. In this example, because the dot product processing component is configured to handle 8-bit integers, the dot product processing component treats the data of layout 504 as thirty-two 8-bit integers as illustrated by layout 506 of FIG. 5. Layout 508 of FIG. 5 illustrates how each 32-bit integer is stored as split segments across four 8-bit elements. For example, group of elements 512 illustrates how the first 32-bit integer of layout 504 can be viewed as four 8-bit values: $x_{03}$ (most significant 8 bits of first 32-bit integer $x_0$), $x_{02}$ (next 8 bits of first 32-bit integer $x_0$), $x_{01}$ (next 8 bits of first 32-bit integer $x_0$), and $x_{00}$ (least significant 8 bits of first 32-bit integer $x_0$). The other seven 32-bit integers of layout 504 ($x_1$ through $x_7$) can also be viewed as arranged as four 8-bit elements from most significant bits to least significant bits.

In various embodiments, four iterations of processing are performed to sum a vector of 32-bit integers using a dot product processing component configured to handle 8-bit integers. Layouts 510 show four corresponding input layouts to be loaded into the dot product processing component with the vector to be reduced during four iterations of processing. The values shown in layouts 510 are either 0 or 1 (in 8-bit format). During a first iteration, a first dot product of the vector to be reduced (e.g., layout 508) with the first layout of layouts 510 is performed, resulting in a first sum $x_{00}+x_{10}+x_{20}+x_{30}+x_{40}+x_{50}+x_{60}+x_{70}$ of 8-bit segments of layout 508. The first sum is a sum of values formed by the least significant 8 bits of each of the 32-bit integers. During a second iteration, a second dot product of the vector to be reduced with the second layout of layouts 510 is performed, resulting in a second sum $x_{01}+x_{11}+x_{21}+x_{31}+x_{41}+x_{51}+x_{61}+x_{71}$ of 8-bit segments of layout 508. The second sum is a sum of values formed by the second least significant 8 bits of each of the 32-bit integers. In various embodiments, data alignment component 408 receives the second sum and performs a leftward bit shift of 8 bits. During a third iteration, a third dot product of the vector to be reduced with the third layout of layouts 510 is performed, resulting in a third sum $x_{02}+x_{12}+x_{22}+x_{32}+x_{42}+x_{52}+x_{62}+x_{72}$ of 8-bit segments of layout 508. The third sum is a sum of values formed by the second most significant 8 bits of each of the 32-bit integers. In various embodiments, data alignment component 408 receives the third sum and performs a leftward bit shift of 16 bits. During a fourth iteration, a fourth dot product of the vector to be reduced with the fourth layout of layouts 510 is performed, resulting in a fourth sum $x_{03}+x_{13}+x_{23}+x_{33}+x_{43}+x_{53}+x_{63}+x_{73}$ of 8-bit segments of layout 508. The fourth sum is a sum of values formed by the most significant 8 bits of each of the 32-bit integers. In various embodiments, data alignment component 408 receives the fourth sum and performs a leftward bit shift of 24 bits. In some embodiments, control logic 113 of FIG. 1 or control logic 203 of FIG. 2 controls loading of input vectors during the four iterations, including loading of vectors corresponding to the layouts of layouts 510. In some embodiments, input vectors are supplied to the dot product processing component by software. In some embodiments, a multiplexer of data alignment component 408 controls the amount of bit shifting performed by a bit shifter of data alignment component 408 based on the iteration (0 bits for the first iteration, 8 bits for the second iteration, 16 bits for the third iteration, and 24 bits for the fourth iteration). In various embodiments, accumulator 410 accumulates bit-shifted versions of the first, second, third, and fourth sums to arrive at a final result that is a sum of a vector of 32-bit integers.

Figure 6:
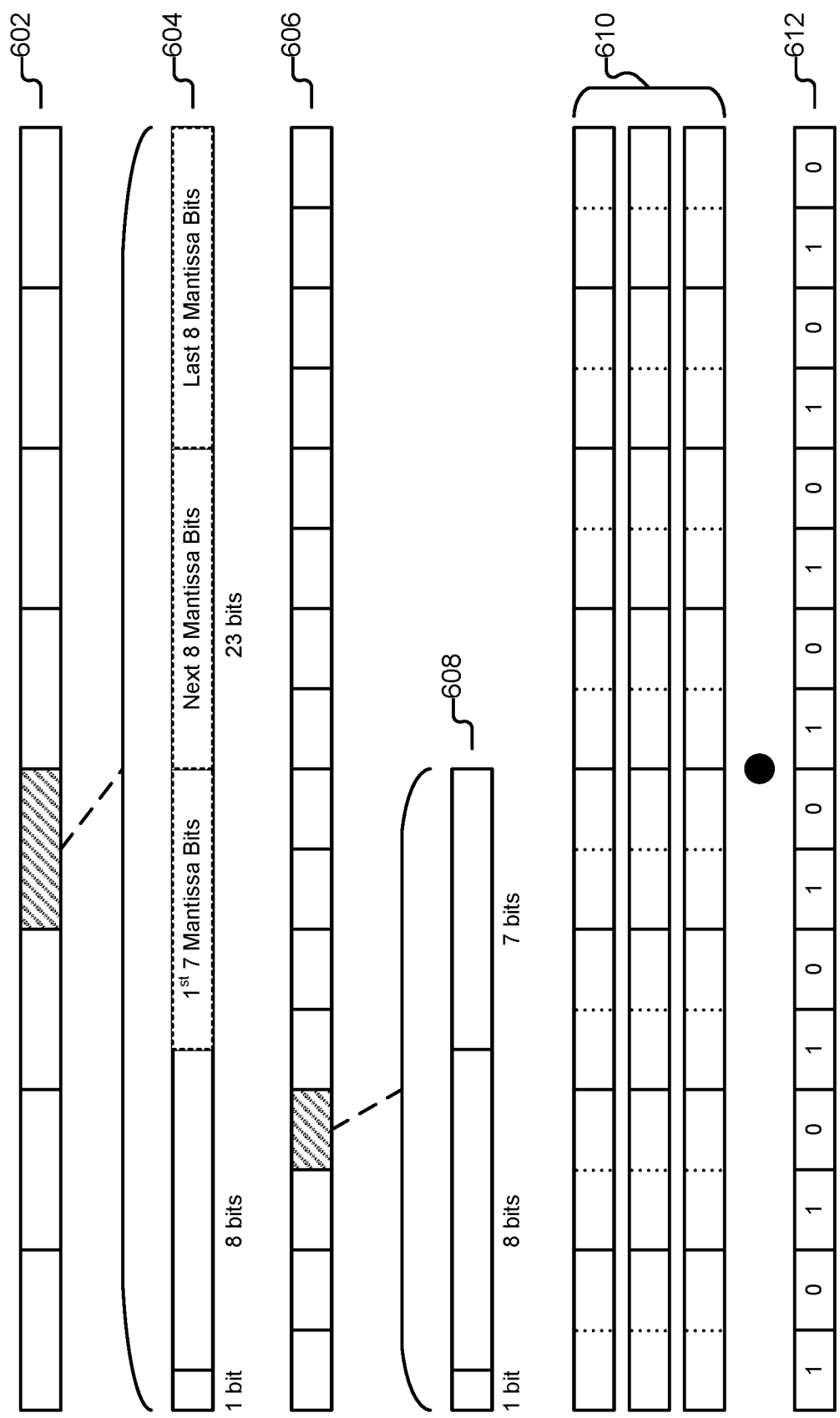
FIG. 6 is a diagram illustrating example data formats associated with processing floating-point numbers.

When reducing a vector of floating-point numbers, for each iteration, one of the inputs is a version of the vector of floating-point numbers to be reduced and the other input is a vector with one and zero values as described below (the two vectors corresponding to input A 402 and input B 404 or vice versa). FIG. 6 illustrates example floating-point data formats associated with reducing a vector of 32-bit floating-point numbers when dot product processing component 406 is configured to handle 16-bit floating-point numbers. In some embodiments, input A 402 and input B 404 are 256-bit data chunks (e.g., same size as data chunk 502 of FIG. 5). In the example illustrated in FIG. 6, within a 256-bit data chunk, eight 32-bit floating-point numbers can be loaded and summed as illustrated by layout 602. In the example illustrated, each floating-point number in layout 602 has the format shown in layout 604 of FIG. 6. Layout 604 shows an fp32 format that has 1 sign bit, 8 exponent bits, and 23 mantissa bits for each 32-bit floating-point number. As shown in layout 604, the mantissa bits can be viewed as being grouped into a first 7 mantissa bits, a middle 8 mantissa bits, and a last 8 mantissa bits. In this example, because the dot product processing component is configured to handle 16-bit floating-point numbers, the dot product processing component treats the data of layout 602 as sixteen 16-bit floating-point numbers as illustrated by layout 606 of FIG. 6. Layout 606 illustrates how each 32-bit floating-point number is stored as split segments across two 16-bit elements. Stated alternatively, each element of layout 602 fits two elements of layout 606. In the example illustrated, each element of layout 606 has the format shown in layout 608 of FIG. 6. Layout 608 shows a bfloat16 format that has 1 sign bit, 8 exponent bits, and 7 mantissa bits for each 16-bit floating-point number. Thus, each element of layout 602 can be viewed as a first 16-bit element comprising a sign bit, 8 exponent bits, and the first 7 mantissa bits of an fp32 element and a second 16-bit element comprising the middle 8 mantissa bits and the last 8 mantissa bits of the fp32 element.

In some embodiments, three iterations of processing are performed to sum a vector of 32-bit floating-point numbers using a dot product processing component configured to handle 16-bit floating-point numbers. Layouts 610 show three data inputs associated with a vector to be reduced that is to be loaded into the dot product processing component with mask vector layout 612 during three iterations of processing. The values shown in mask vector layout 612 are either 0 or 1 (in bfloat16 format in this example). During a first iteration, a first dot product of the first layout of layouts 610 with mask vector layout 612 is performed. In various embodiments, the first layout of layouts 610 is an unmodified version of the vector to be reduced. This results in a first sum that is a sum of bfloat16 versions of the elements in the vector to be reduced because mask vector layout 612 alternates between 1 and 0 every 16 bits and the first 16 bits of each fp32 element has the same format as a bfloat16 number. During a second iteration, a second dot product of the second layout of layouts 610 with mask vector layout 612 is performed to obtain a second sum. In various embodiments, the second layout of layouts 610 is a modified version of the vector to be reduced in which instead of using the first 7 mantissa bits of each fp32 element (as is the case during the first iteration), the middle 8 mantissa bits of each fp32 element are used (replacing the first 7 mantissa bits of each fp32 element). In various embodiments, it is possible to replace the first 7 mantissa bits with the middle 8 mantissa bits because the dot product processing component is configured to handle a J-bit, which can be replaced with a mantissa bit. In various embodiments, data alignment component 408 receives the second sum and subtracts 8 from the exponent portion of the second sum to account for the shifted placement of the middle 8 mantissa bits relative to the first mantissa bit in the fp32 format. During a third iteration, a third dot product of the third layout of layouts 610 with mask vector layout 612 is performed to obtain a third sum. In various embodiments, the third layout of layouts 610 is a modified version of the vector to be reduced in which the last 8 mantissa bits of each fp32 element are used (replacing the middle 8 mantissa bits from the second iteration). In various embodiments, data alignment component 408 receives the third sum and subtracts 16 from the exponent portion of the third sum to account for the shifted placement of the last 8 mantissa bits relative to the first mantissa bit in the fp32 format. In some embodiments, control logic 113 of FIG. 1 or control logic 203 of FIG. 2 controls loading of input vectors during the three iterations. Multiplexers may be used to route different groups of mantissa bits to the dot product processing component. In some embodiments, input vectors are supplied to the dot product processing component by software. In some embodiments, a multiplexer of data alignment component 408 controls the amount to subtract from an exponent portion performed by a subtractor unit of data alignment component 408 based on the iteration (0 for the first iteration, 8 for the second iteration, and 16 for the third iteration). In various embodiments, accumulator 410 accumulates modified (subtraction performed on exponents) versions of the first, second, and third sums to arrive at a final result that is a sum of a vector of 32-bit floating-point numbers.

FIG. 5 is a diagram illustrating example data formats associated with processing integer numbers. Further description of FIG. 5 is provided above in the description associated with FIG. 4.

FIG. 6 is a diagram illustrating example data formats associated with processing floating-point numbers. Further description of FIG. 6 is provided above in the description associated with FIG. 4.

Figure 7:
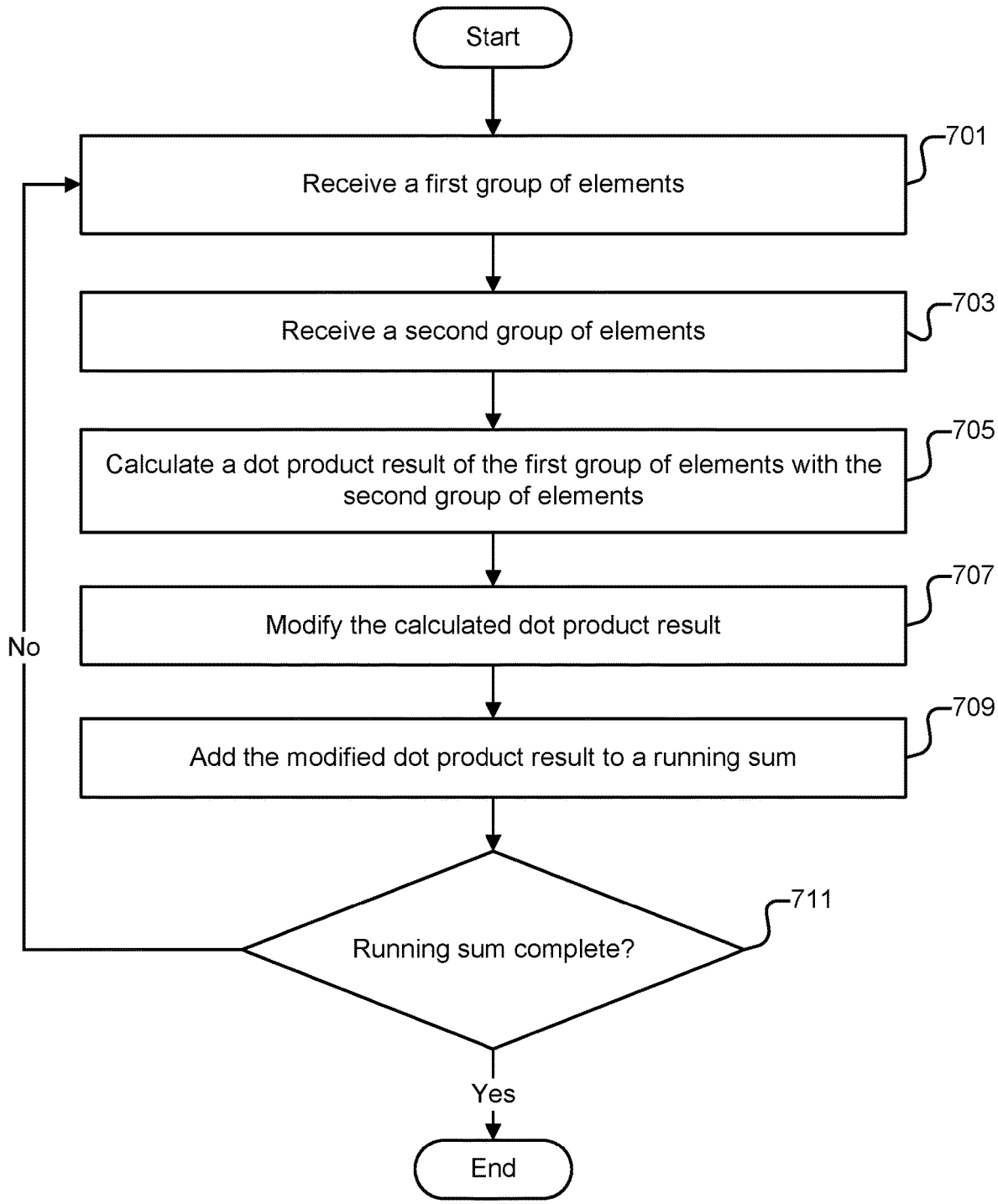
FIG. 7 is a flow chart illustrating an embodiment of a process for handling groups of numbers using a lower-bit-width dot product engine.

FIG. 7 is a flow chart illustrating an embodiment of a process for handling groups of numbers using a lower-bit-width dot product engine. In some embodiments, the process of FIG. 7 is performed by system 400 of FIG. 4. In some embodiments, at least a portion of the process of FIG. 7 is performed in 305 of FIG. 3.

At 701, a first group of elements is received. In some embodiments, the first group of elements is received by dot product processing component 406 of FIG. 4. The first group of elements may be input A 402 of FIG. 4. In some embodiments, the first group of elements is associated with a vector of integers (e.g., in int32 format) or a vector of floating-point numbers (e.g., in fp32 format) to be summed. The first group of elements may be an unmodified or modified version of the vector to be summed. In some scenarios, the first group of elements is modified according to which iteration of processing is occurring (e.g., see the floating-point example associated with FIG. 4).

At 703, a second group of elements is received. In some embodiments, the second group of elements is received by dot product processing component 406 of FIG. 4. The second group of elements may be input B 404 of FIG. 4. In some embodiments, the second group of elements is a mask vector, which when used to compute a dot product with the first group of elements, contributes a portion of the sum of values of the elements in the first group of elements. In some scenarios, the second group of elements is modified according to which iteration of processing is occurring (e.g., see the integer example associated with FIG. 4). Because dot products are commutative, the first group of elements and the second group of elements can be any one of two inputs to a dot product processing component without affecting the dot product result. For example, the first group of elements and the second group of elements can be input A 402 and input B 404 of FIG. 4, respectively, or vice versa.

At 705, a dot product result of the first group of elements with the second group of elements is calculated. In some embodiments, the dot product result is calculated using dot product processing component 406 of FIG. 4. For example, the dot product result may be a single integer or floating-point number.

At 707, the calculated dot product result is modified. In some embodiments, the modification is performed by data alignment component 408 of FIG. 4. In scenarios with an integer dot product result, the modification can include bit shifting the integer dot product result a specified amount based on which iteration of processing is occurring. In scenarios with a floating-point dot product result, the modification can include subtracting a specified value from an exponent portion of the floating-point dot product result based on which iteration of processing is occurring.

At 709, the modified dot product result is added to a running sum. In some embodiments, accumulator 410 of FIG. 4 receives the modified dot product result and maintains the running sum.

At 711, it is determined whether the running sum is complete. In some embodiments, determining whether the running sum is complete includes determining whether a specified number of iterations of processing have been completed. For example, in some embodiments, four iterations of processing, including calculation of four dot product results, occur in order to reduce a vector of 32-bit integers using a dot product processing component that can natively handle 8-bit integers. In some embodiments, three iterations of processing, including calculation of three dot product results, occur in order to reduce a vector of 32-bit floating-point numbers using a dot product processing component that can natively handle 16-bit floating-point numbers. If at 711 it determined that the running sum is complete (e.g., the required number of iterations have been completed), then no further processing occurs and the value of the running sum is the final value (e.g., the value stored in accumulator 410 of FIG. 4 after all iterations have been completed). If at 711 it is determined that the running sum is not completed (e.g., more iterations are required), at 701, another iteration is started by receiving another first group of elements. For example, the running sum may not be complete until a fourth and a third iteration for reducing vectors of integer and floating-point numbers, respectively. In some embodiments, control logic 113 of FIG. 1 or control logic 203 of FIG. 2 determines whether the running sum is complete. In some embodiments, once processing is complete, the final result is written to memory (e.g., memory 131 of FIG. 1 via bus 151 or via bus 251 of FIG. 2).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A device, comprising:
   a dot product processing component configured to calculate a dot product of a first group of elements stored in a first storage unit with a second group of elements, wherein:
   each element of the first group of elements is represented using a first number of bits;
   each value of a group of values stored in the first storage unit is represented using a second number of bits greater than the first number of bits; and
   each value of the group of values is stored as split segments across more than one element of the elements of the first group of elements;
   a data alignment component configured to:
   receive results of the dot product processing component; and
   modify one or more of the results of the dot product processing component; and
   an accumulator configured to sum outputs of the data alignment component to at least in part determine a sum of the group of values.

2. The device of claim 1, wherein the first storage unit includes one or more registers.

3. The device of claim 1, wherein the first storage unit is configured to store 256 bits.

4. The device of claim 1, further comprising a second storage unit configured to store the second group of elements.

5. The device of claim 1, wherein each element of the second group of elements is represented using the first number of bits and has a value that is either zero or one.

6. The device of claim 1, wherein the dot product is an integer dot product.

7. The device of claim 1, wherein the first number of bits is eight bits and the second number of bits is thirty-two bits.

8. The device of claim 1, wherein the data alignment component is configured to modify the one or more results of the dot product processing component including by being configured to bit shift the one or more results based at least in part on an iteration count.

9. The device of claim 1, wherein the dot product is a floating-point dot product.

10. The device of claim 1, wherein the first number of bits is sixteen bits and the second number of bits is thirty-two bits.

11. The device of claim 10, wherein the first number of bits are formatted in a Brain Floating Point floating-point format and the second number of bits are formatted in a single-precision floating-point format.

12. The device of claim 1, wherein the data alignment component is configured to modify the one or more results of the dot product processing component including by being configured to subtract a specified value from an exponent portion of the one or more results based at least in part on an iteration count.

13. The device of claim 1, wherein the data alignment component includes a selection logic component configured to select a data modification based at least in part on an iteration count.

14. The device of claim 1, wherein the data alignment component includes a subtractor or an adder configured to add negative numbers.

15. The device of claim 1, wherein the device is an application-specific integrated circuit device.

16. The device of claim 1, wherein the dot product is a part of an artificial neural network operation.

17. A method, comprising:
   using a dot product processing component to receive g a first group of elements, wherein:
   the first group of elements is stored in a first storage unit;
   each element of the first group of elements is represented using a first number of bits;
   each value of a group of values stored in the first storage unit is represented using a second number of bits greater than the first number of bits; and
   each value of the group of values is stored as split segments across more than one element of the elements of the first group of elements;
   using the dot product processing component to receive a second group of elements;
   using the dot product processing component to calculate a dot product of the first group of elements with the second group of elements;
   using a data alignment component to receive results associated with the calculated dot product;
   using the data alignment component to modify one or more but not all of the results of the calculated dot product to determine aligned results; and
   using an accumulator to sum the aligned results to at least in part determine a sum of the group of values.

18. The method of claim 17, wherein the first storage unit includes one or more registers.

19. The method of claim 17, wherein the first storage unit is configured to store 256 bits.

20. The method of claim 17, wherein the second group of elements is stored in a second storage unit.

* * * * *